PATENTED DEC 29 1970
3,550,956
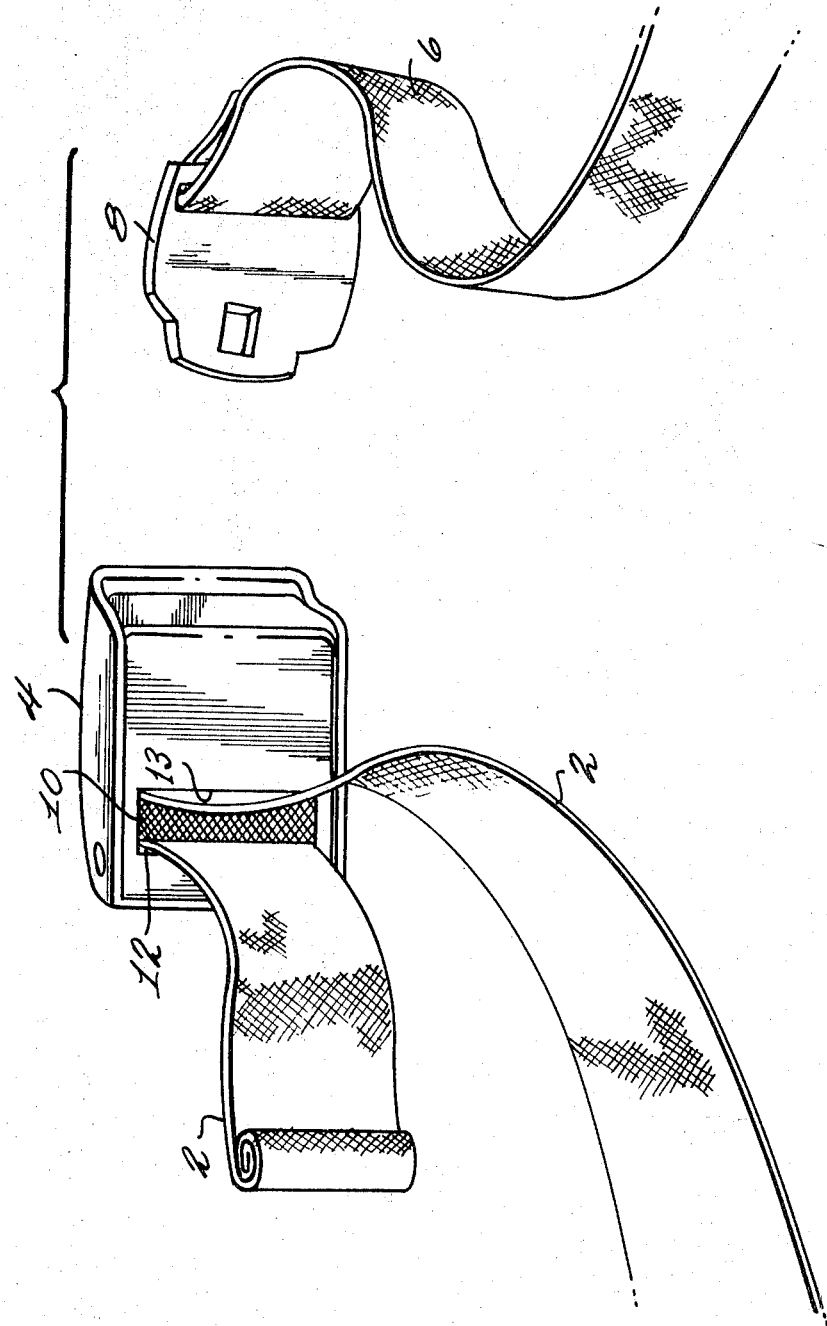
INVENTOR
JOHN J. LOWE
BY Cushman Darby & Cushman
ATTORNEYS INVENTOR.
DONALD G. RADKE
FREDERICK C. BOOTH
BY
*Hawke Knass & Gifford*
ATTORNEYS

SHOULDER HARNESS WITH BELT ELONGATION MEANS

CROSS-REFERENCE TO RELATED APPLICATIONS

This application is a continuation-in-part of application Ser. No. 649,881, now abandoned, filed Jun. 29, 1967 and entitled "Seat Belt With Energy Absorbing Stitching."

BACKGROUND OF THE INVENTION

1. Field of the Invention

This invention is related to vehicle safety seat belt assemblies, and more specifically to a shoulder harness having stitched doubled sections of the webbing arranged above the shoulder of the occupant so that the webbing elongates from an initial length toward a final length at a controlled rate under the influence of a predetermined restraining force.

2. Description of the Prior Art

A typical vehicle safety seat belt system is designed to restrict the displacement of an occupant with respect to his seated position when the vehicle experiences a sudden and sharp deceleration. The object of such seat belt systems is to prevent the occupant from continuing in the direction of the former travel of the vehicle until he is stopped by relatively unyielding surfaces of the passenger compartment.

Crash studies have indicated that a secondary problem results when the occupant has both lap and shoulder belt restraints. After the initial impact of the vehicle, the occupant tends to move forward until the slack in the belts has been taken up sufficiently to build up restraining forces. The relatively unyielding belts then cause the occupant to snap back toward his original position where he experiences neck and back injuries as he impacts the back structure of the seat assembly. If the crash is severe and the lap belt is not sufficiently tight the occupant may then "submarine" under the lap belt in a forwardly direction. It has been found that by providing belt elongation means disposed within the shoulder harness and above the shoulder of the occupant the kinetic energy of the occupant as he is displaced forward from his seated position will be absorbed and the tendency for submarining will be substantially reduced.

SUMMARY

The preferred embodiment of the present invention, which will be subsequently described in greater detail, takes the form of an elongated webbing forming a shoulder harness portion of a vehicle safety seat belt assembly. The upper end of the webbing is adapted to be rigidly attached to the vehicle behind and above the seat assembly. The lower end of the webbing partially embraces an occupant of the seat and is coupled with means anchored to a lower fixed part of the vehicle.

The webbing has a pair of sections disposed to be above the shoulder of an occupant when in use and doubled about a transverse fold line and sewn together by a series of substantially longitudinally extending stitches. The doubled sections retain their sewn together condition under normal load conditions providing an operative tensile connection between the occupant and the anchored end of the webbing. When an occurrence causes the vehicle to experience a sudden deceleration so that the occupant shifts forwardly from his seated position, the webbing develops a restraining force acting on the occupant. When the restraining force reaches a predetermined magnitude, the doubled sections commence a progressive separation toward the fold line so that the belt elongates at a controlled rate. The kinetic energy of the occupant is absorbed by the parting stitches as the doubled sections unfold. By absorbing the kinetic energy of the occupant, the preferred webbing eliminates the rebound effect and subsequent submarining and the occupant experience experiences a cushioned forward deceleration.

Preferably the stitches separate when about 700 pounds of tensile force are applied to the webbing with the doubled sections providing a total elongation of 6 inches under the predetermined load.

The stitched, folded webbing is normally folded again about a second transverse fold line adjacent the stitches until the stitched sections are flat against the unsewn webbing. The fold is retained in this position either by tacking the fold to the unsewn webbing or by a thin plastic sleeve. The tacking and the sleeve are each designed to secure the unparted stitched sections in the folded position when normal restraining forces are applied to the webbing, but allow the stitching to commence parting when the restraining forces increase to the predetermined magnitude.

DESCRIPTION OF THE DRAWINGS

The description refers to the accompanying drawing in which like reference characters refer to like parts throughout the several views and in which.

DESCRIPTION OF THE PREFERRED EMBODIMENT

Figure 1:
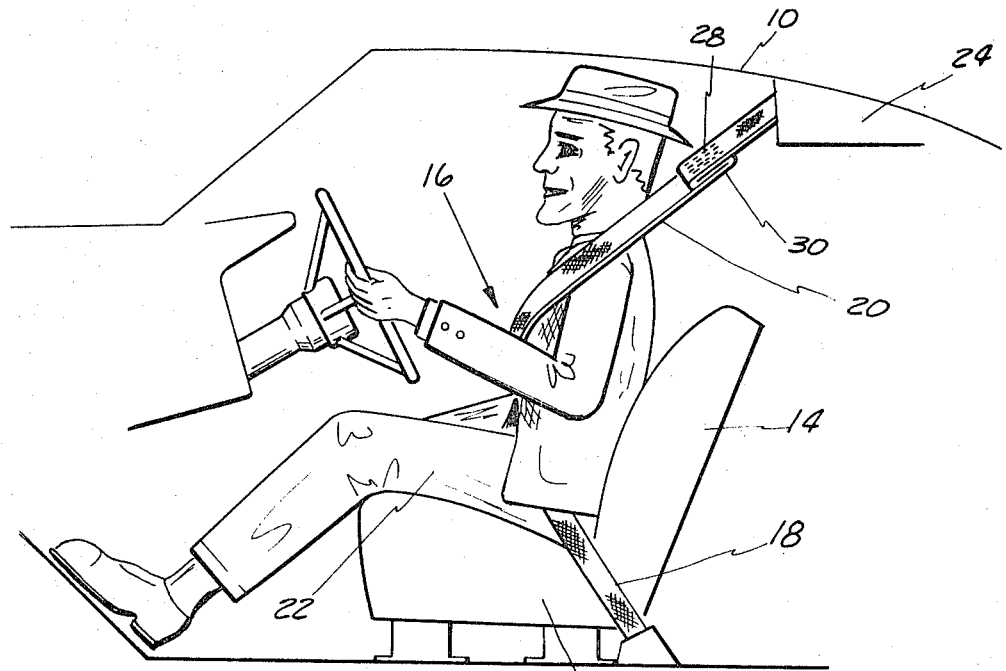
FIG. 1 is a schematic view of a vehicle and an occupant with a lap and shoulder belt assembly illustrating a preferred embodiment of the invention before the vehicle experiences a sudden deceleration.

Now referring to the drawings, FIG. 1 illustrates a vehicle 10 having a seat assembly 12 including an upright back supporting portion 14. A safety seat belt assembly 16 having a lap section 18 and a shoulder section 20 is arranged to restrain an occupant 22 of the seat assembly 12.

The upper end of the shoulder section 20 is preferably connected by an automatic locking retractor 24 to a structural part of the vehicle 10 behind and above the seat assembly 12. The locking retractor 24 is of the type which allows the webbing to be normally freely extensible and retractable from a stored position to permit the occupant to perform normal body movements, but which automatically locks the webbing to the vehicle 10 when the webbing begins to extend at an abnormal rate as the occupant is suddenly shifted forwardly from the seat assembly. It is to be understood that the upper section of the shoulder section 20 may be anchored directly to the vehicle 10. The lower end of the substantially nonstretchable webbing 20 partially embraces the occupant 22 and is joined to a companion section of webbing (not shown) which is anchored to a lower portion of the vehicle structure.

Figure 2:
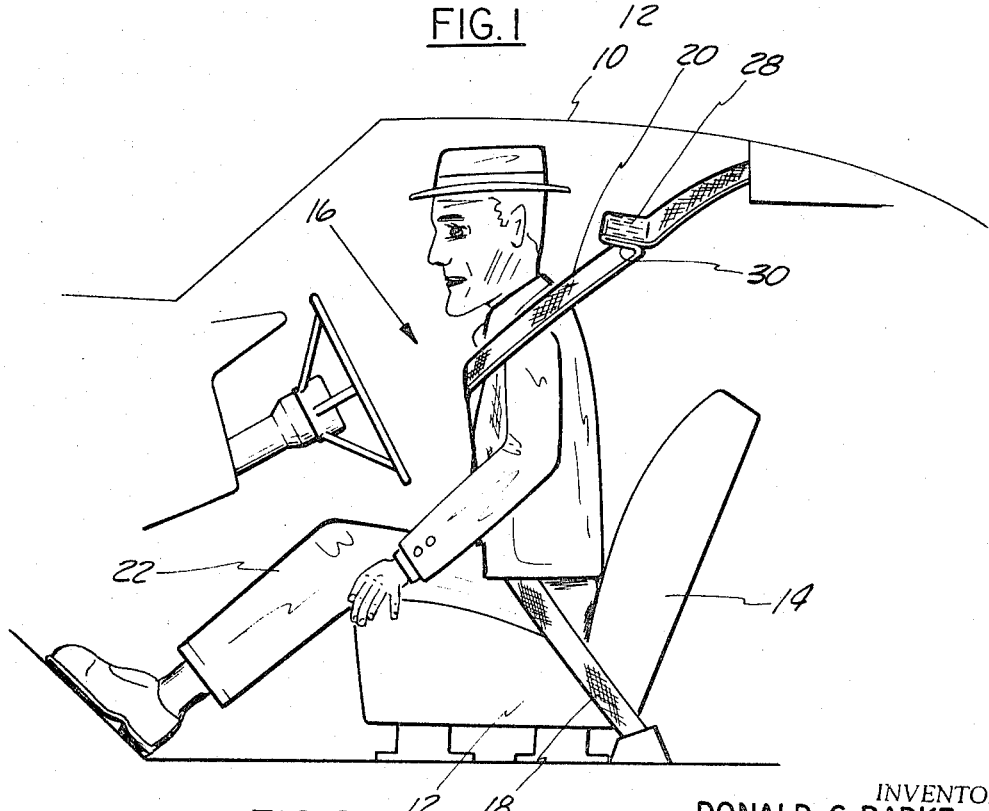
FIG. 2 is a view similar to FIG. 1 but showing the occupant gradually decelerating after the vehicle has experienced a sudden deceleration.
Figure 3:
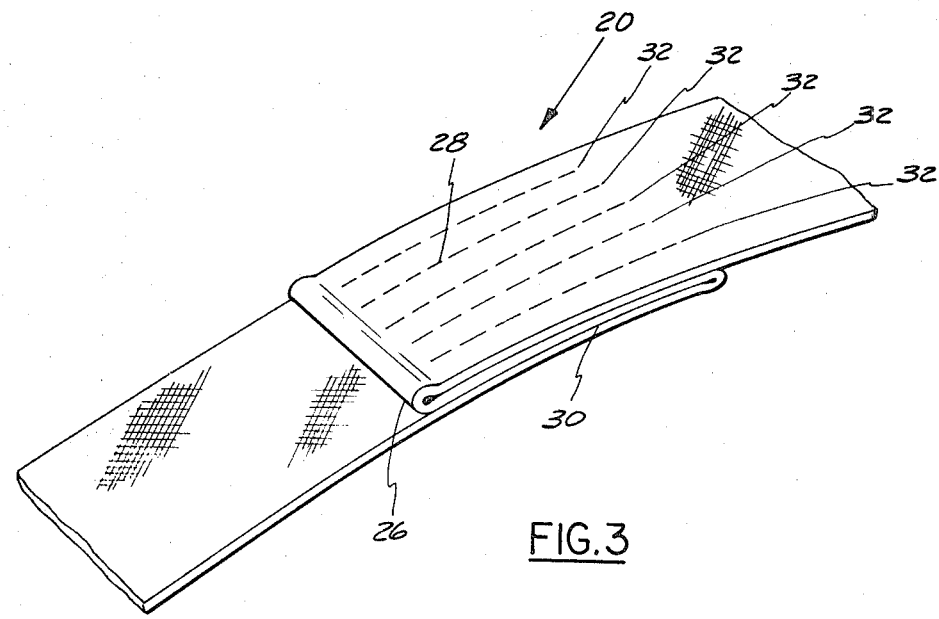
FIG. 3 is an enlarged perspective view of a section of the shoulder belt assembly of FIG. 1.

As best seen in FIGS. 1 and 2, the webbing 20 is folded around a transverse fold line 26 (FIG. 3) to form a pair of doubled sections 28 and 30. The sections 28 and 30 are disposed in a position to be just above the shoulder of the occupant as shown and are sewn together by a series of longitudinally extending stitches 32 which extend longitudinally for a predetermined length from the fold line 26. Preferably the doubled sections 28 and 30 are stitched for a 3 inch length so that they provide a 6 inch extension between the initial folded and the final unfolded length of the webbing 26.

Figure 4:
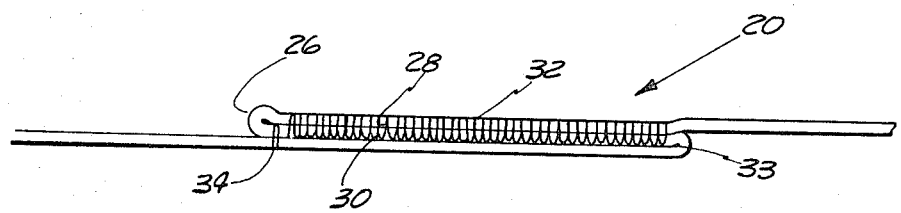
FIG. 4 is a side view of the webbing of FIG. 3, and illustrating the stitched doubled sections in an unparted condition.

As best seen in FIG. 4, the stitched sections of webbing 28 and 30 are folded about a second fold line 33 longitudinally spaced from fold line 26 and connecting the section 30 to the body of the webbing 20. The stitched sections 28 and 30 are laid flat against the unsewn webbing and the fold line 26 is joined to the webbing 20 by a short tack 34.

The stitches 32 are sewn together with a thread having a strength chosen so that the stitches commence to rip apart when a predetermined restraining force is applied to the webbing 20. Preferably the overlapping sections 28 commence to part when a 700 pound tensile force is applied to the webbing 20.

Figure 5:
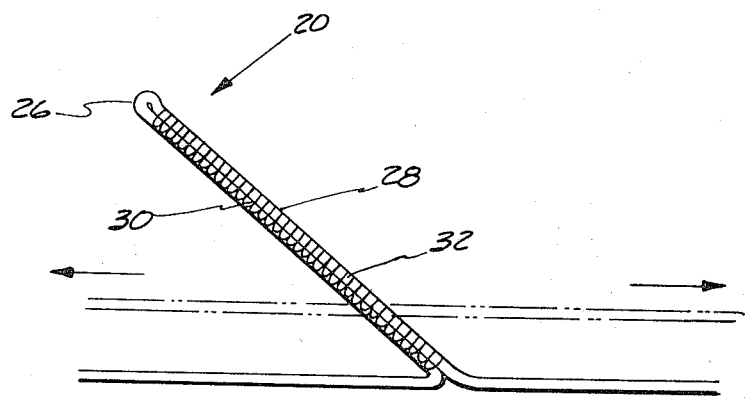
FIG. 5 is a view illustrating the webbing of FIG. 3 with the doubled sections partially separated.
Figure 6:
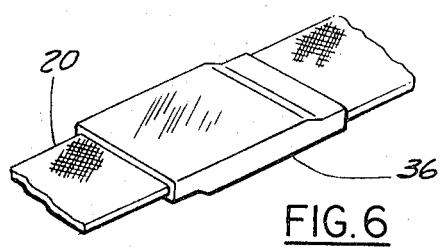
FIG. 6 is a view of a preferred webbing with a sleeve retaining the stitched sections in their normal unparted condition.

When the predetermined force is applied to the webbing 20, the short tack 34 initially parts and then the stitches 32 begin to progressively separate in a longitudinal direction from the fold line 33 toward the fold line 26. As best seen in FIG. 5, as the sections 20 and 30 separate, the webbing 20 elongates at a controlled rate.

The effect of this elongation can be best described with reference to FIGS. 1 and 2. As the vehicle 10 is suddenly contacted by a barrier, it instantaneously begins to decelerate at a rate dictated by the crush properties of the front structure of the vehicle. The occupant 22 continues to move forwardly at his original velocity and since the lower half of his body is securely retained against the bottom of the seat by lap belt 18 the upper portion of his body will tilt forward until this forward motion has taken up any slack in the shoulder section 20. When the restraining force reaches a determined magnitude, preferably 700 pounds, the doubled sections 28 and 30 commence to separate so that the occupant's forward motion is gradually reduced at a rate dictated by the rate of separation of the stitches 32. This gradual deceleration continues until the doubled sections 28 and 30 are fully unfolded. Because the occupant's kinetic energy has been absorbed in separating the stitches, he maintains substantially the position shown in FIG. 2 and experiences a cushioned deceleration without rebound back toward his initial position. The particular positioning of the doubled sections 28 and 30 have been found to be important in preventing submarining. Elongation of the belt just above the shoulder acts to maintain the forwardly tilting position of the body and this prevents the body from submarining from beneath the lap belt 18.

We claim:

1. In a vehicle having a seat, means for restraining movement of an occupant of the seat relative to the vehicle, comprising an elongated shoulder belt having one end attached to the vehicle and its opposite end adapted for attachment to the vehicle, said shoulder belt extending downwardly across the shoulder of the occupant to partially embrace the occupant and means disposed within said belt adjacent and above the shoulder of the occupant to permit said belt to elongate a predetermined length upon a predetermined tensile force being applied to said belt.

2. The restraining means as defined in claim 1, and in which said shoulder belt comprises elongated webbing and said last mentioned means comprises a pair of longitudinally doubled sections folded about a transverse fold line, said fold line being disposed above and adjacent the shoulder of an occupant, a series of stitches joining said pair of doubled sections for a predetermined length from said fold line, said stitches being breakable upon the application of a predetermined tensile force on said webbing said shoulder belt gradually lengthens in the section above the shoulder of the occupant.

3. The invention as defined in claim 2, wherein said doubled sections are folded about a second transverse fold line in an unstitched section of said webbing so that said doubled sections lay flat in a normal position against said unstitched sections of said webbing and including yieldable means retaining said doubled sections in said normal position.

4. The invention as defined in claim 3, wherein said yieldable means comprise said doubled sections being tacked to said unstitched section of webbing.

5. The invention as defined in claim 3, wherein said yieldable means comprise a deformable sleeve embracing said doubled sections and said unstitched section.